United States Patent
Choi et al.

(10) Patent No.: US 10,551,003 B2
(45) Date of Patent: Feb. 4, 2020

(54) ADSORBED NATURAL GAS STORING TANK

(71) Applicant: Hyundai Motor Company, Seoul (KR)

(72) Inventors: Pil Seon Choi, Gyeonggi-do (KR); Bu Yeol Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 555 days.

(21) Appl. No.: 15/332,345

(22) Filed: Oct. 24, 2016

(65) Prior Publication Data
US 2017/0292654 A1    Oct. 12, 2017

(30) Foreign Application Priority Data
Apr. 6, 2016  (KR) .......................... 10-2016-0042090

(51) Int. Cl.
| | |
|---|---|
| *F17C 13/00* | (2006.01) |
| *F17C 11/00* | (2006.01) |
| *B01D 46/00* | (2006.01) |
| *F17C 13/08* | (2006.01) |
| *B01D 46/42* | (2006.01) |

(52) U.S. Cl.
CPC ........ *F17C 11/007* (2013.01); *B01D 46/0005* (2013.01); *F17C 13/08* (2013.01); *B01D 46/4272* (2013.01); *B01D 2279/00* (2013.01); *F17C 2201/0128* (2013.01); *F17C 2205/01* (2013.01); *F17C 2205/0323* (2013.01); *F17C 2205/0341* (2013.01);
(Continued)

(58) Field of Classification Search
CPC .......... F17C 2270/0168; F17C 2260/04; F17C 2205/0341; F17C 2221/033; F17C 2270/0184; B01D 46/0006; B01D 46/0012; B01D 46/4272; B01D 46/0005
USPC ......................................................... 220/581
See application file for complete search history.

(56) References Cited

U.S. PATENT DOCUMENTS

| | | | | |
|---|---|---|---|---|
| 2002/0194996 | A1* | 12/2002 | Peter ................. | B01D 46/0063 95/278 |
| 2009/0159465 | A1* | 6/2009 | Mayer .................... | F16K 17/04 206/0.6 |

(Continued)

FOREIGN PATENT DOCUMENTS

| | | |
|---|---|---|
| JP | H09309347 A | 12/1997 |
| JP | 2000-146092 A | 5/2000 |

(Continued)

*Primary Examiner* — Anthony D Stashick
*Assistant Examiner* — Raven Collins
(74) *Attorney, Agent, or Firm* — Mintz Levin Cohn Ferris Glovsky and Popeo, P.C.; Peter F. Corless

(57) ABSTRACT

An adsorbed natural gas storing tank is provided. The adsorbed natural gas storing tank includes a tank body that has an upper plate and a lower plate coupled to define an inner space provided with an adsorbent material. The tank body includes an opening that extends through the upper and lower plates. A central plate is inserted in the opening to seal one side of the tank body. Additionally, the central plate has a plurality of discharge apertures formed along a circumferential wall thereof to discharge natural gas reacted with the adsorbent material and has a mounting region therein. A filter assembly is inserted in the mounting region, is fastened to the central plate, filters natural gas passing through the discharge apertures, and is equipped with a control valve for adjusting natural gas discharge.

5 Claims, 5 Drawing Sheets

(52) U.S. Cl.
CPC .... *F17C 2221/033* (2013.01); *F17C 2260/04* (2013.01); *F17C 2270/0168* (2013.01)

(56) References Cited

U.S. PATENT DOCUMENTS

2010/0146917 A1* 6/2010 Coulonvaux ...... B01D 46/0005
                   55/344
2014/0151386 A1* 6/2014 Alioto ...................... F15B 1/26
                   220/745

FOREIGN PATENT DOCUMENTS

| | | | |
|---|---|---|---|
| JP | 2001-182896 | A | 7/2001 |
| JP | 2003-028397 | A | 1/2003 |
| JP | 2003-336797 | A | 11/2003 |
| JP | 2008-151219 | A | 7/2008 |

* cited by examiner

ADSORBED NATURAL GAS STORING TANK

CROSS-REFERENCE TO RELATED APPLICATION

This application claims under 35 U.S.C. § 119(a) the benefit of priority to Korean Patent Application No. 10-2016-0042090 filed on Apr. 6, 2016, the entire contents of which are incorporated herein by reference.

BACKGROUND

(a) Technical Field

The present disclosure relates to an adsorbed natural gas storing tank, and more particularly, to an adsorbed natural gas storing tank capable of achieving provision of a low-pressure storing tank compared to a conventional compressed natural gas storing tank, using an adsorbent material.

(b) Background Art

Recently, research in various fields for development of alternative energy sources as a petroleum energy substitute has been actively performed as part of an effort to cope with problems such as depletion of petroleum resources and environmental pollution. For vehicles, as a main source of air pollution, global automobile manufacturers and automotive parts suppliers face a challenge of realization of low pollution. Accordingly, automobile manufacturers are striving to develop alternative energy resources, which are capable of significantly decreasing emission of harmful substances compared to conventional fuel such as gasoline or diesel.

As part of these efforts, research has been conducted regarding compressed natural gas (CNG) vehicles using CNG fuel. Meanwhile, for a vehicle using CNG fuel, a high-pressure vessel for storing CNG fuel is mounted to a vehicle body. A vessel valve is installed at an outlet of the high-pressure vessel for selective supply of CNG fuel. In particular, a fuel pipe is connected to the vessel valve and, as such, the high-pressure vessel and the vessel valve are connected in parallel by the fuel pipe. Accordingly, CNG fuel discharged from the high-pressure vessel via the vessel valve is supplied to an engine through the fuel pipe.

It is important to increase energy density of natural gas stored in the high-pressure vessel. Accordingly, an inner space of the high-pressure vessel is filled with an adsorbent material (e.g. activated charcoal, zeolite, metal organic frameworks (MOF)) having a large surface area. Thus, an internal pressure of the high-pressure vessel may be decreased, thereby increasing degree of shape freedom of the high-pressure vessel.

The above information disclosed in this section is merely for enhancement of understanding of the background of the invention and therefore it may contain information that does not form the prior art that is already known in this country to a person of ordinary skill in the art.

SUMMARY

The present invention provides an adsorbed natural gas storing tank including an adsorbent material provided at an inner space of a tank body to adsorb methane gas into micropores of the adsorbent material each having a uniform size, thereby being capable of decreasing kinetic energy of methane molecules and an internal pressure of the tank body to achieve provision of a low-pressure storing tank compared to a conventional compressed natural gas storing tank.

In one aspect, the present invention provides an adsorbed natural gas storing tank that may include a tank body having an upper plate and a lower plate coupled to define an inner space provided with an adsorbent material, the tank body having an opening that extends through the upper and lower plates, a central plate inserted in the opening to seal one side of the tank body, the central plate having a plurality of discharge apertures formed along a circumferential wall thereof to discharge natural gas reacted with the adsorbent material, the central plate having a mounting region therein, and a filter assembly inserted in the mounting region, fastened to the central plate, filtering natural gas passing through the discharge apertures, and equipped with a control valve for controlling natural gas discharge. In an exemplary embodiment, the tank body may further include a material supply port formed at the upper plate, for supplying the absorbent material to the inner space of the tank body, and a coupling plate installed at the material supply port, for insertion and fastening of an opening/closing cover.

In another exemplary embodiment, the central plate may further include a main plate having a "U" shape to seal the opening at the side of the upper plate, and having the discharge apertures extending through and being formed along a circumferential wall of the main plate, and a mounting plate inserted in the opening at the side of the upper plate to be coupled to the main plate, the mounting plate including a step formed at an inner surface thereof, where the filter assembly may be disposed on in a fitted manner, to be fastened to the step. In addition, the discharge apertures may include a mesh-shaped net in an inner surface thereof. The filter assembly may be separable together with the control valve from the mounting region.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not imitative of the present invention, and wherein.

Figure 1:
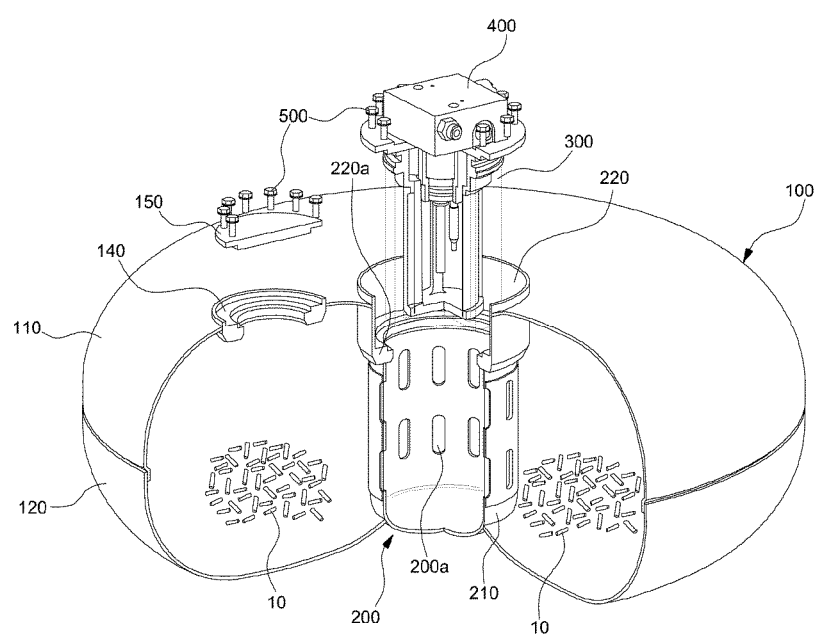
FIG. 1 is a view illustrating a separated state of a filter assembly of an adsorbed natural gas storing tank according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiment of the present invention will be described in detail with reference to the accompanying drawings to allow those skilled in the art to easily practice the present invention. Advantages and features of the present invention and methods for achieving the same will be clearly understood with reference to the following detailed description of exemplary embodiments in conjunction with the accompanying drawings.

However, the present invention is not limited to the exemplary embodiments disclosed herein, but may be implemented in various different forms. The exemplary embodiments are merely given to make the disclosure of the present invention be perfect and to perfectly instruct the scope of the invention to those skilled in the art, and the present invention should be defined by the scope of claims. In addition, in the description of the present invention, a detailed description of related known technologies and the like will be omitted when it is judged to make the subject of the present invention unclear.

Figure 2:
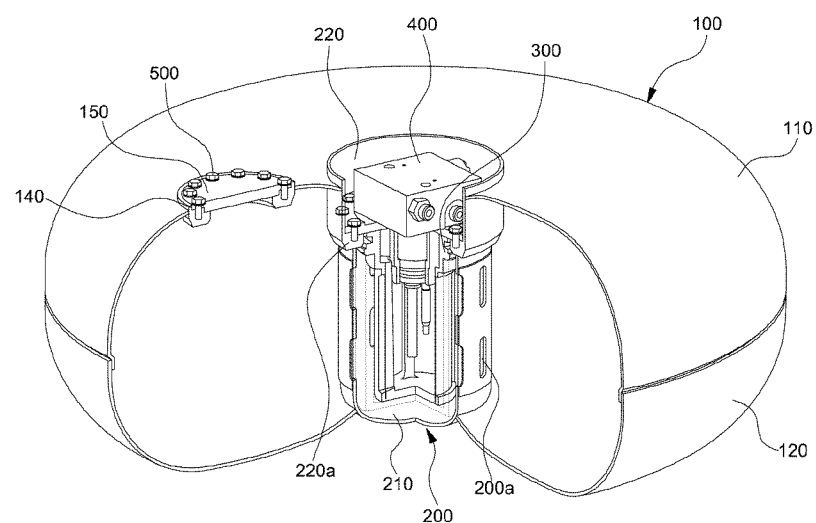
FIG. 2 is a view illustrating an assembled state of the filter assembly of the adsorbed natural gas storing tank according to the illustrated exemplary embodiment of the present invention.
Figure 3:
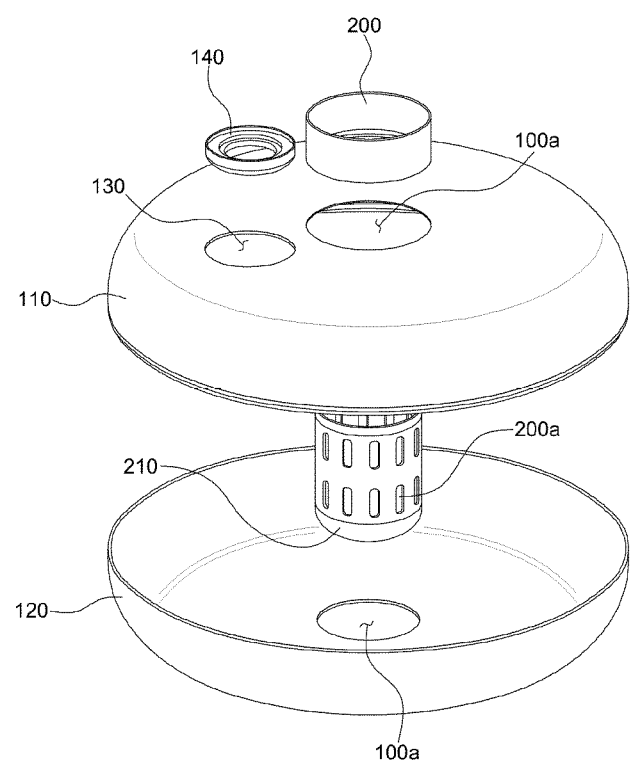
FIG. 3 is a view illustrating a central plate of the adsorbed natural gas storing tank according to the illustrated exemplary embodiment of the present invention.
Figure 4:
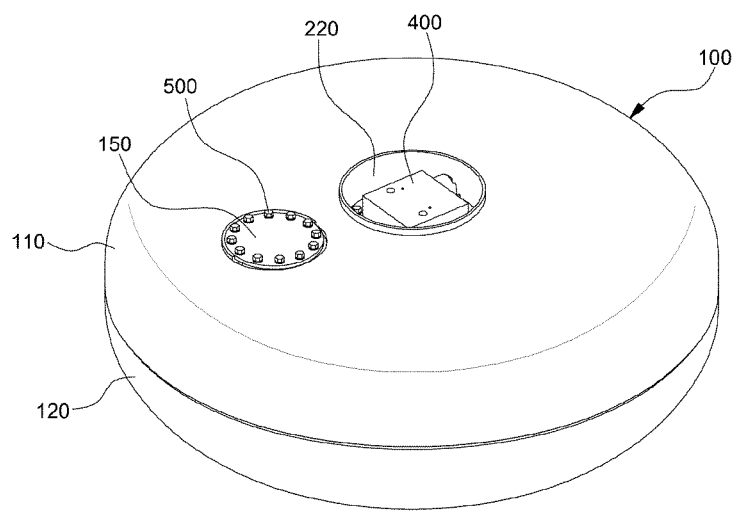
FIG. 4 is a view illustrating a tank body of the adsorbed natural gas storing tank according to the illustrated exemplary embodiment of the present invention.

FIG. 1 is a view illustrating a separated state of a filter assembly of an adsorbed natural gas storing tank according to an exemplary embodiment of the present invention. FIG. 2 is a view illustrating an assembled state of the filter assembly of the adsorbed natural gas storing tank according to the illustrated exemplary embodiment of the present invention. FIG. 3 is a view illustrating a central plate of the adsorbed natural gas storing tank according to the illustrated exemplary embodiment of the present invention. FIG. 4 is a view illustrating a tank body of the adsorbed natural gas storing tank according to the illustrated exemplary embodiment of the present invention.

As illustrated in FIGS. 1, 2 and 3, the adsorbed natural gas storing tank may include a tank body 100, a central plate 200, and a filter assembly 300. First, the tank body 100 may be configured by coupling an upper plate 110 to a lower plate 120. The tank body 100 may include an opening 100*a* that extends through the upper and lower plates 110 and 120 in a vertical direction. An adsorbent material 10 may be provided in the tank body 100. The adsorbent material 10 reacts with natural gas and, as such, methane gas contained in natural gas may be adsorbed in micropores of the adsorbent material 10, each having a uniform size. Thus, kinetic energy of methane molecules may decrease, thereby decreasing an internal pressure of the tank body 100.

In other words, when the same amount of natural gas used in a conventional compressed natural gas storing tank is adsorbed in the adsorbed natural gas storing tank, the internal pressure of the tank body 100 may be decreased by nearly one tenth. Accordingly, a steel vessel having a relatively thin thickness may be used as the tank body 100 to increase degree of shape freedom of the storing tank. The tank body 100 may have a doughnut shape (e.g., hollow ring shape), in which the opening 100*a* may be extended through the coupled upper and lower plates 110 and 120 (e.g., a center hole through the coupled plates), but the shape is not limited thereto. For example, the tank body 100 may have a quadrangular shape while having the opening 100*a* to couple the central plate 200 to the tank body 100.

Additionally, to more easily manufacture the tank body 100, the upper and lower plates 110 and 120 and the central plate 220 may be coupled by welding or a similar technique to form the tank body 100. Furthermore, to dispose the adsorbent material 10 in the inner space of the tank body 100, a material supply port 130 for the adsorbent material 10 may be formed at the upper plate 110. A coupling plate 140 may be installed at the material supply port 130 and thus, an opening/closing cover 150 may open and close the material supply port 130. The cover 150 may be firmly fastened to the coupling plate 140 by fastening elements 500.

The tank body 100 according to the illustrated exemplary embodiment of the present invention may be applied to a low-pressure storing tank compared to the conventional compressed natural gas storing tank, using the absorbent material 10. In particular, it is important that the adsorbent material 10 is not discharged to the tank body 100 through the opening 100*a*. Thus, according to the illustrated exemplary embodiment of the present invention, the central plate 200 may be provided. Particularly, the central plate 200 may be coupled to the opening 100*a* for sealing one side of the tank body 100. The central plate 200 may also function as a filter for filtering natural gas discharged from the tank body 100.

In other words, the central plate 200 may include a plurality of discharge apertures 200*a* formed along a circumferential wall of the central plate 200 to prevent the adsorbent material 10 from being discharged when natural gas reacted with the adsorbent material 10 in the tank body 100 is discharged from the tank body 100 by a control valve 400. The diameter of each discharge aperture 200a may be less than the size of the adsorbent material 10. A mesh-shaped net may be installed inside the discharge apertures 200a to filter off the adsorbent material 10.

Meanwhile, the central plate 200 may include a main plate 210 and a mounting plate 220. Particularly, the main plate 210 may be formed in a "U" shape to seal the opening 100a at the side of the lower plate 120. The discharge apertures 220a may be formed along a circumferential wall of the main plate 210 while extending through the circumferential wall of the main plate 210. Furthermore, the mounting plate 220 may be inserted into the opening 100a at the side of the upper plate 110, to be fastened to the main plate 210. The mounting plate 220 may have a step 220a (e.g., a protrusion) formed at an inner surface of the mounting plate 220 and, as such, the filter assembly 300 may be disposed on the step 220a in a fitted manner, and may be fastened to the step 200a by the fastening elements 500.

In other words, a protruded upper part of the filter assembly 300 may be disposed on the step 220a of the mounting plate 220 in a fitted manner when the filter assembly 300 is inserted into a mounting region of the central plate 200. In this state, the fastening elements 500 may be inserted into through apertures (not shown) disposed at the protruded upper part of the filter assembly 300, and an end (e.g., a first end) of each fastening element 500 may be fastened to a corresponding end of fastening grooves (not shown) disposed at the step 220a of the mounting plate 220, and thus, the position of the filter assembly 300 may be fixed.

Under the condition that the opening 100a is sealed at the side of the lower plate 120 by the main plate 210, the filter assembly 300 may be disposed on the step 220a in the fitted manner to seal the opening 100a at the side of the upper plate 110. Natural gas filtered while passing through the discharge apertures 200a may be discharged when the control valve 400 is controlled to be opened. The control valve 400 may be operated by a controller. The filter assembly 300 may be internally provided with an airtight structure that includes a filter paper, a bracket for fixing the filter paper, and an O-ring. Such a structure is the same as that of the conventional filter assembly, and thus a detailed configuration and effects thereof will be omitted.

The control valve 400 may be mounted in the upper part of the filter assembly 300 in an inserted manner. In particular, the control valve 400 may be configured to adjust natural gas discharge via opening and closing control of the valve. When the control valve 400 is opened, natural gas in the tank body 100 may be filtered while sequentially passing through the discharge apertures 200a and the filter assembly 300, and then may be transferred to an engine via the fuel pipe. The control valve 400 may be fitted in the filter assembly 300, to be fastened to the filter assembly 300 and, as such, an integrated structure may be formed. The filter assembly 300 may be replaceable through removal thereof from the mounting region together with the control valve 400 after unfastening of the fastening elements 500 When the filter assembly 300 malfunctions due to long use or other errors, the filter assembly 300 may be removed from the mounting region. Thus, the filter installed in the filter assembly 300 may be removed more easily.

Figure 5:
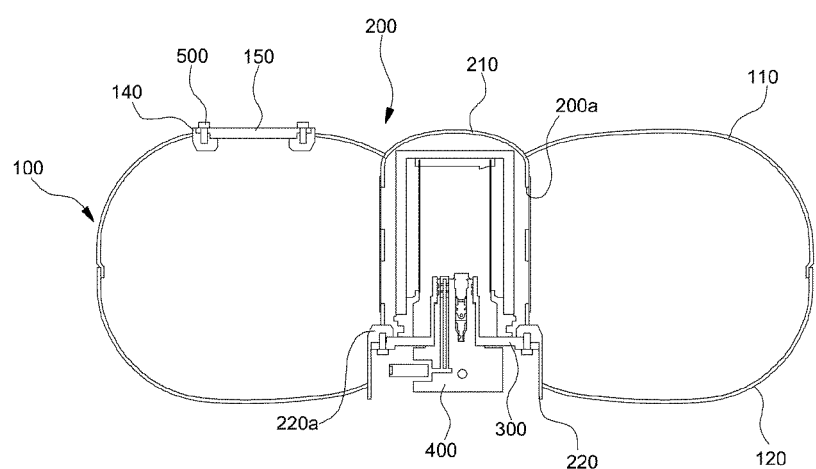
FIG. 5 is a view schematically illustrating an adsorbed natural gas storing tank according to another exemplary embodiment of the present invention.

Furthermore, as illustrated in FIG. 4, when the filter assembly 300 is inserted into the mounting region, the filter assembly 300 may be seated such that a top surface thereof has a lower level than a top surface of the tank body 100. Alternatively, the top surface of the filter assembly 300 may be seated to protrude from the top surface of the tank body 100 according to structural characteristics of vehicles. Additionally, FIG. 5 is a view schematically illustrating an adsorbed natural gas storing tank according to another exemplary embodiment of the present invention. As illustrated in FIG. 5, the adsorbed natural gas storing tank may include a central plate 200. The central plate 200 may include a main plate 210 and a mounting plate 220.

In particular, the main plate 210 may be inserted into an opening 100a at the side of a lower plate 120 to seal the opening 100a at the side of an upper plate 110. As in the case of FIGS. 1 to 4, the main plate 210 may have a "U" shape and may include discharge apertures 200a that extend through a circumferential wall of the main plate 210. Namely, insertion and installation of the main plate 210 according to the exemplary embodiment of FIG. 5 may be in a reverse direction to that of the exemplary embodiment of FIGS. 1 to 4. In particular, accordingly, the mounting plate 220 may be installed at the opening 100a at the side of the lower plate 120, not the upper plate 110. Thus, according to the illustrated exemplary embodiments of the present invention, the central plate 200 may be installed in any one of the upper and lower plates 110 and 120 of the tank body 100 based on a structure of the vehicle, thereby more easily coping with structural installation conditions in the vehicle.

As apparent from the above description, in accordance with the present invention, the adsorbent material may be supplied to the inner space of the tank body and methane gas may be adsorbed in the microholes of the adsorbed material, each having a uniform size, thereby decreasing kinetic energy of methane molecules and the internal pressure of the tank body. As a result, the adsorbed natural gas storing tank may have a lower internal pressure than that of the conventional compressed natural gas storing tank. According to the illustrated exemplary embodiment of the present invention, degree of shape freedom of the storing tank in accordance with internal pressure decrease of the tank body may be increased.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:
1. An adsorbed natural gas storing tank, comprising:
a tank body including an upper plate and a lower plate coupled to define an inner space provided with an adsorbent material, the tank body having an opening that extends through the upper and lower plates;
the adsorbent material being provided to the inner space of the tank so as to react with natural gas;
a central plate inserted in the opening to seal one side of the tank body, the central plate having a plurality of discharge apertures formed along a circumferential wall thereof to discharge natural gas reacted with the adsorbent material, the central plate having a mounting region therein; and
a filter assembly inserted in the mounting region, fastened to the central plate, filtering natural gas passing through the discharge apertures, and equipped with a control valve for adjusting natural gas discharge,
wherein the tank body includes:

a material supply port formed at the upper plate, to supply the adsorbent material to the inner space of the tank body; and a coupling plate installed at the material supply port, for insertion and fastening of an opening/closing cover.

2. The adsorbed natural gas storing tank of claim 1, wherein the central plate includes:

a main plate having a "U" shape to seal the opening at the side of the lower plate, and having the discharge apertures that extend through and being formed along a circumferential wall of the main plate; and a mounting plate inserted in the opening at the side of the upper plate to be coupled to the main plate, the mounting plate including a step formed at an inner surface thereof, wherein the filter assembly is disposed in a fitted manner, to be fastened to the step.

3. The adsorbed natural gas storing tank of claim 1, wherein the central plate includes:

a main plate having a "U" shape to seal the opening at the side of the upper plate, and having the discharge apertures that extend through and being formed along a circumferential wall of the main plate; and a mounting plate inserted in the opening at the side of the lower plate to be coupled to the main plate, the mounting plate including a step formed at an inner surface thereof, wherein the filter assembly is disposed in a fitted manner, to be fastened to the step.

4. The adsorbed natural gas storing tank of claim 1, wherein the plurality of discharge apertures includes a mesh-shaped net in an inner surface thereof.

5. The adsorbed natural gas storing tank of claim 1, wherein the filter assembly is separable together with the control valve from the mounting region.

* * * * *